Figures 1, 2:
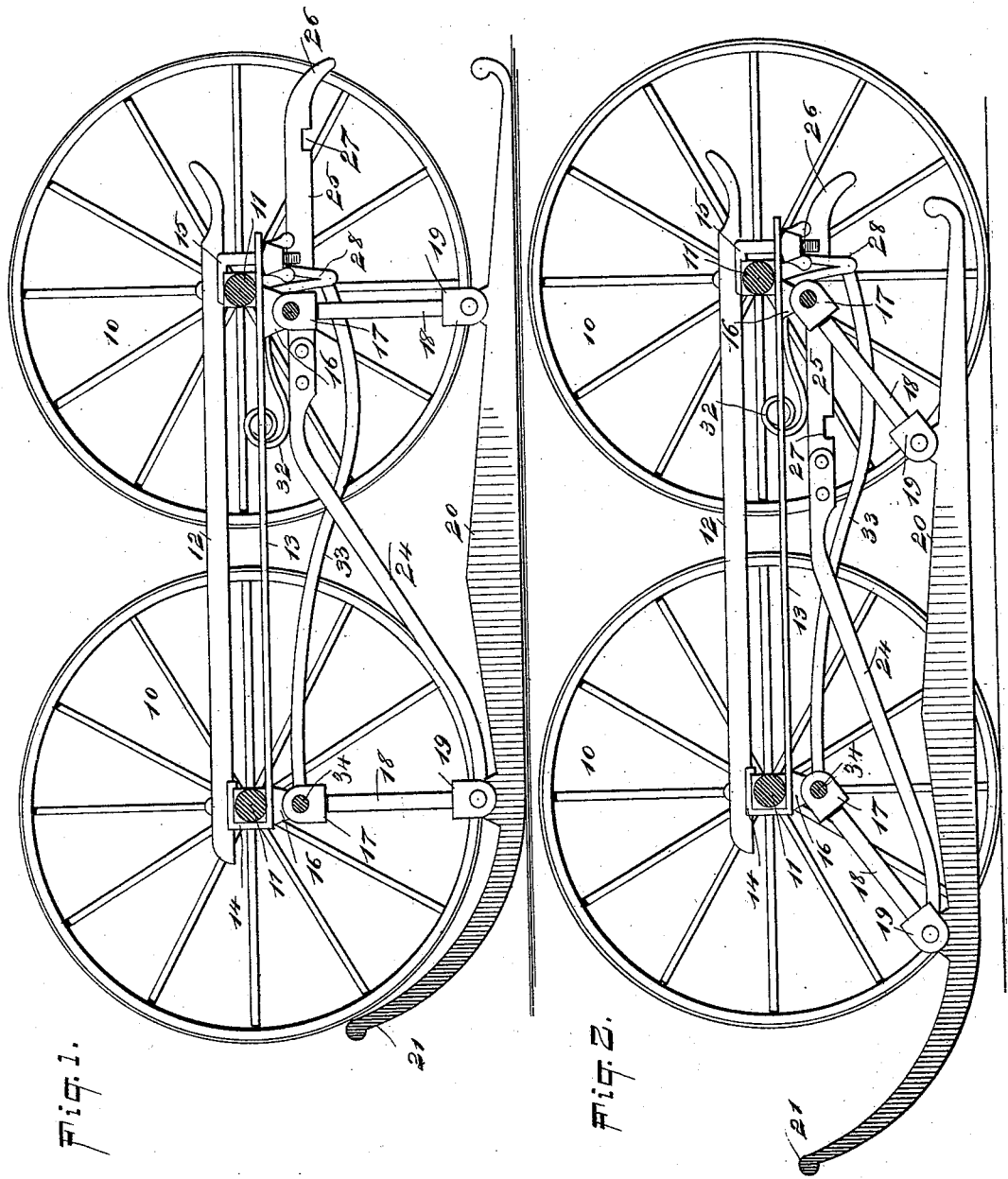

(No Model.) 2 Sheets—Sheet 1.
W. J. LE BARRON.
RUNNER ATTACHMENT FOR VEHICLES.

No. 529,922. Patented Nov. 27, 1894.

WITNESSES:
William Goebel
C. Sedgwick

INVENTOR
W. J. Le Barron
BY
Munn & Co
ATTORNEYS.

(No Model.) 2 Sheets—Sheet 2.
W. J. LE BARRON.
RUNNER ATTACHMENT FOR VEHICLES.
No. 529,922. Patented Nov. 27, 1894.
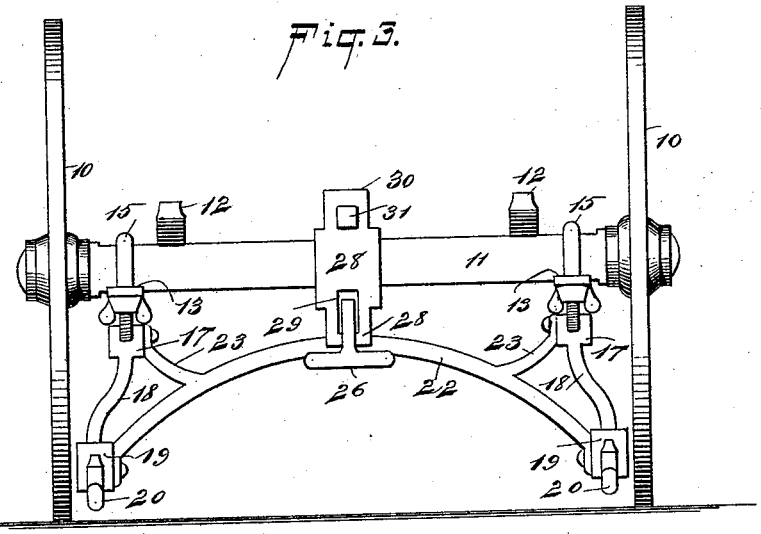
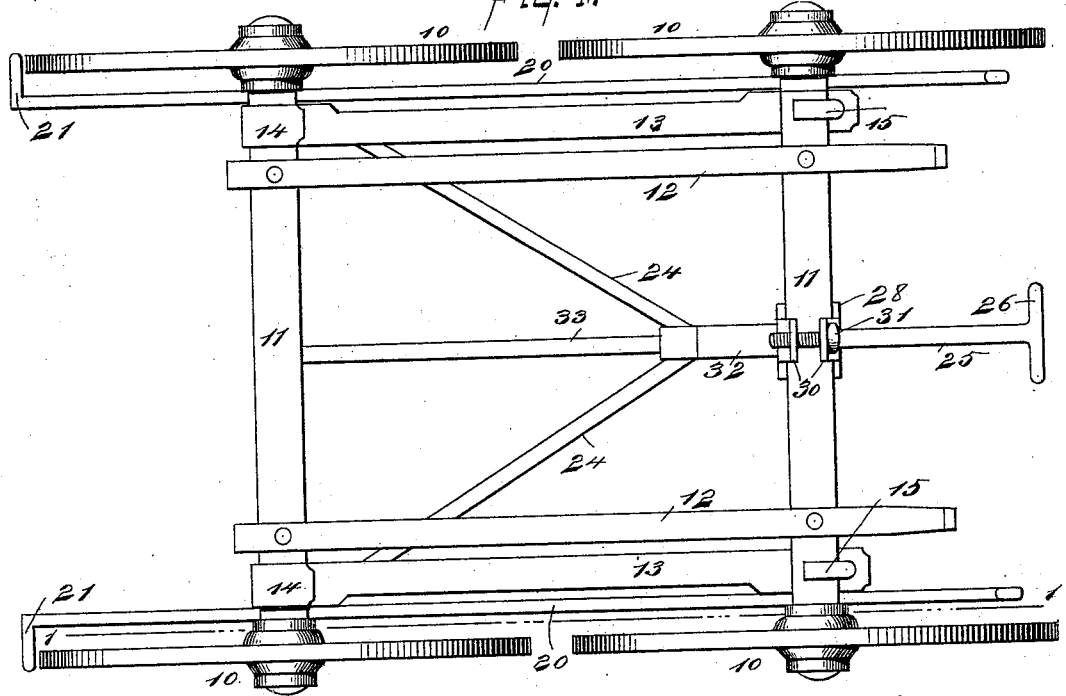
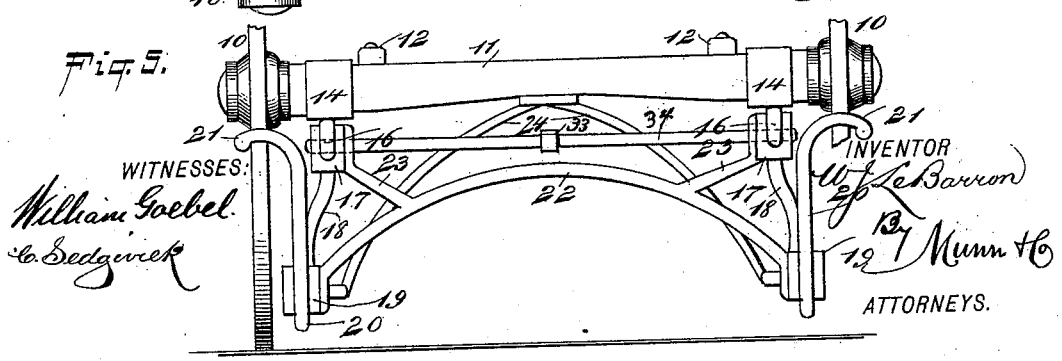
WITNESSES:
William Goebel
C. Sedgwick
INVENTOR
W. J. Le Barron
By Munn & Co.
ATTORNEYS.

UNITED STATES PATENT OFFICE.

WALTER J. LE BARRON, OF BARRE, VERMONT.

RUNNER ATTACHMENT FOR VEHICLES.

SPECIFICATION forming part of Letters Patent No. 529,922, dated November 27, 1894.

Application filed March 5, 1894. Serial No. 502,395. (No model.)

*To all whom it may concern:*

Be it known that I, WALTER J. LE BARRON, of Barre, in the county of Washington and State of Vermont, have invented a new and Improved Running Attachment for Wheeled Vehicles, of which the following is a full, clear, and exact description.

My invention relates to improvements in vehicles; and the object of my invention is to produce a simple, strong and easily operated attachment, which may be applied to any kind of a wheeled vehicle, and which may be instantly operated so as to enable the vehicle to be mounted on runners, or may be moved so as to throw the runners out of the way and permit the vehicle to run on wheels.

The improvement is adapted to ordinary carriages, enables them to be easily converted from wheeled vehicles to those having runners, as specified, and when applied to a baby carriage, the attachment not only performs the function above referred to but it enables the carriage to be steadily supported at any time so that it may be conveniently used as a cradle.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a sectional side elevation of the running gear of an ordinary vehicle provided with my improved runner attachments, these attachments being arranged so as to support the gear on runners. Fig. 2 is a similar section, but with the runners raised so as to permit the vehicle to run on its wheels. Fig. 3 is a rear end view of the running gear with the runners raised. Fig. 4 is a plan view of the running gear with my improved attachments applied thereto; and Fig. 5 is a broken front elevation of the same.

The running gear may be of any ordinary kind and, as illustrated, it comprises four wheels 10, which are journaled on axles 11, these being connected by reach rods 12 of the usual kind. In addition to these reach rods 12, I employ two outer supporting bars or reach rods 13 which are arranged beneath the axles and on opposite sides of the vehicle, the rods running parallel with each other and each rod or bar 13 has one upturned end 14 which engages the front axle, and the rear end of the said rod or bar is supported by an L-bolt 15. On the under side of the reach rods or supporting bars 13, near the ends of the said bars, are lugs 16 to which are pivoted the enlarged upper ends or joints 17 of the depending hangers 18, which at their lower ends terminate in joints or enlargements 19 and these are pivoted to lugs on the parallel runners 20, which may be of any approved construction, but which have preferably upturned and outwardly-turned ends 21. The hangers and runners are braced by the curved cross braces 22 which extend from the joint 19 to the similar joint of the opposite hanger, and the braces 22 are also provided with arms 23 which are secured to the joints 17 of the hangers and thus the hangers and runners are efficiently braced. The joints 19 of the front hangers have also pivoted to them connecting rods 24, which are preferably bent outward at their lower ends to form the bolts which constitute the pivots of the hangers, and the rods 24 are, at their upper ends, secured to a slide bar 25 which projects horizontally behind the rear axle so that it may be conveniently reached, and at this point it terminates in a handle 26.

The bar 25 is provided, near its opposite ends and on its lower side, with notches 27, which are adapted to engage the lower portion of a clip 28 through a slot 29 of which the slide bar runs, as shown clearly in Fig. 3. This clip 28 is fastened to the rear axle near the center and it has upwardly-projecting lugs 30 at the top, which are connected by a bolt 31 and, by tightening this bolt, the clip is securely fastened to the axle, while by removing the bolt the clip may be swung off the axle.

By pushing the slide bar 25 forward, the runners are swung forward and upward, as shown in Fig. 2, and the rear notch 27 of the slide bar 25 engages the clip 28, thus holding the runners in this position so that the vehicle may run freely on its wheels. When, however, the slide bar is pulled back, the hangers 18 are pulled into a vertical position, thus bringing the runners upon the ground and lifting the wheels, as shown in Fig. 1. The runners are held in this position by dropping the forward notch of the slide bar into engagement with the clip 28.

In working the runners it is of course necessary to lift the slide bar 25 before it can be moved in either direction. The slide bar is pressed into engagement with the clip by a spring 32 which is arranged above it, as shown in Figs. 5 and 2, and the clip is braced and made rigid by a brace 33 which extends from the lower portion of the clip to the front brace 34 which connects the joints of the front hangers 18.

In applying the attachment to vehicles having a pivoted front axle, some modification of the reach bars, 13, is necessary; that is to say, the loops, 14, at the ends of said bars require to be lengthened, or extended endwise, in order to permit the pivoted axle to oscillate.

It will be seen from the foregoing description, that the attachments may be easily applied to or removed from the vehicle, as by removing the L-bolts 15 and the clip 28, all the remaining parts of the attachments may be removed.

Having thus described my invention, I claim as new and desire to secure by Letters Patent—

1. The combination with the running gear of a vehicle, of reach rods or bars detachably secured to the opposite ends of the axles, hangers pivotally suspended from the supporting bars, runners pivotally connected to the hangers, a guide member secured to the rear axle, a slide bar pivotally connected at the front end to the front hanger and having a horizontally disposed handle portion longitudinally movable on the said guide, and means for holding such bar in a locked position on the guide, all substantially as shown and described.

2. The combination, with the running gear of a vehicle, of detachable reach rods or supporting bars secured to opposite ends of the axles, hangers suspended from the supporting bars near opposite ends, runners pivoted to the hangers, cross braces connecting the hangers, a pendent slotted clip on the rear axle, a slide bar held to move in the clip, connecting rods extending from the slide bar to the runners, and a spring attached to the clip and projecting forward for locking the slide bar to the clip, substantially as described.

WALTER J. LE BARRON.

Witnesses:
ARTHUR W. LE BARRON,
C. H. CAMPBELL.